United States Patent Office.

RUSS B. WALKER, OF CLAREMONT, NEW HAMPSHIRE.

Letters Patent No. 77,784, dated May 12, 1868.

IMPROVEMENT IN WAXING FLOORS.

*The Schedule referred to in these Letters Patent and making part of the same.*

TO ALL WHOM IT MAY CONCERN:

Be it known that I, RUSS B. WALKER, of the town of Claremont, in the county of Sullivan, and State of New Hampshire, have invented a new Composition of Matter for Waxing Floors, and a new mode or method of applying the same to the floor; and I do hereby declare that the following is a full, clear, and exact description of the same, sufficient to enable those skilled in the art to practise it.

All waxing-compositions designed for application to floors for dancing-halls, or for other floors, where, instead of carpeting or other covering, the wooden surface is left exposed, have heretofore, so far as I am aware, been made into a liquid form, and applied whilst in this liquid state to the floor. Much difficulty, delay, and labor attend this mode of waxing, the liquid is liable to be unevenly spread, and it sometimes requires from three days to a week properly to wax a large hall.

My composition is of such a character that it may be thrown or sprinkled upon the floor in a dry state, and in the form of a powder, and requiring no further time or labor after it has been so spread, the feet of those dancing or walking over the floor causing the material to be more thoroughly diffused and pressed to the floor.

In the manufacture of my composition, I melt together beeswax, paraffine, and spermaceti, in the proportion of about twenty parts out of a hundred of beeswax, sixty parts of paraffine, and ten parts of spermaceti. I then mix about two parts of Prussian blue with two parts of linseed-oil, and put this mixture in with the above mixture of beeswax, paraffine, and spermaceti. When the same have been melted together, and when this composition has nearly cooled, I add and intermix with it oils of cinnamon, bergamot, and lavender, or either of them, as may be found desirable, say, two parts, or thereabouts, of each.

It is evident that other oils or flavoring-material may be substituted for or added to those above named.

The whole composition (which may be fused or melted in an ordinary kettle) may now be turned from the kettle into boxes, coated within with common mucilage. When it has become hard, I reduce it to shavings by scraping with a common knife, or by the use of any other implement adapted to the purpose, and these shavings may now be reduced to powder by simply rubbing them between the hands, and this powder is then ready to be sprinkled or spread broadcast over the floor, and which can be done in a few minutes, and immediately before dancing commences, when used for that purpose.

It is evident that my composition is applicable for waxing other surfaces as well as floors.

I claim the combination of beeswax, spermaceti, and paraffine, or its equivalent, in such proportions that the whole may be reduced to powder, substantially as and for the purpose set forth.

I also claim the method or process, herein described, of waxing floors, by sprinkling thereon a waxing-material, when the same is in a dry and pulverized or powdered state.

RUSS B. WALKER. [L. S.]

Witnesses:
DANA BICKFORD,
A. M. LAWSON.